United States Patent
Russo et al.

(10) Patent No.: US 9,341,138 B2
(45) Date of Patent: May 17, 2016

(54) ENGINE ASSEMBLY FOR A MOTOR VEHICLE IN GENERAL AND PARTICULARLY FOR AN URBAN MOTOR VEHICLE

(75) Inventors: Vitaliano Russo, Milan (IT); Giorgio Targa, Milan (IT)

(73) Assignee: Ariante Limited (GB)

( * ) Notice: Subject to any disclaimer, the term of this patent is extended or adjusted under 35 U.S.C. 154(b) by 895 days.

(21) Appl. No.: 12/993,671

(22) PCT Filed: May 19, 2009

(86) PCT No.: PCT/EP2009/003572
§ 371 (c)(1),
(2), (4) Date: Jan. 19, 2011

(87) PCT Pub. No.: WO2009/141120
PCT Pub. Date: Nov. 26, 2009

(65) Prior Publication Data
US 2011/0100738 A1     May 5, 2011

(30) Foreign Application Priority Data

May 20, 2008 (EP) .................................... 08425356

(51) Int. Cl.
*B60K 6/46*     (2007.10)
*F02G 1/055*     (2006.01)
*B60K 6/24*     (2007.10)
(Continued)

(52) U.S. Cl.
CPC . *F02G 1/055* (2013.01); *B60K 6/24* (2013.01); *B60K 6/44* (2013.01); *B60W 10/08* (2013.01); *B60W 20/00* (2013.01); *F02G 2254/00* (2013.01); *F02G 2256/00* (2013.01); *F02G 2256/50* (2013.01); *Y02T 10/623* (2013.01); *Y02T 10/6295* (2013.01)

(58) Field of Classification Search
USPC ...................................... 60/516–526, 645–681
See application file for complete search history.

(56) References Cited

U.S. PATENT DOCUMENTS 3,613,358 A    10/1971   Meijer
3,778,578 A *   12/1973   Long et al. .................... 219/687
(Continued)

FOREIGN PATENT DOCUMENTS

AU     2001261910 B2    11/2005
GB     1530126 A *   10/1978 ................ F01K 3/00
(Continued)

OTHER PUBLICATIONS

International Preliminary Report on Patentability issued Oct. 28, 2010.

*Primary Examiner* — Thomas Denion
*Assistant Examiner* — Mickey France
(74) *Attorney, Agent, or Firm* — Akerman LLP

(57) ABSTRACT

An engine assembly (6) of the type running on liquid air or another gas that is substantially inert in liquefied state, for a vehicle in general and for an urban motor vehicle in particular, such as a bus (1) or a taxi, comprises a Stirling engine (9), in which the gasification of the liquid air takes place, with transformation into kinetic mechanical energy of the latent heat relative to the change in state of the air from liquid state to compressed gas state, as well as a volumetric or flow motor (11), in which the air in compressed state expands up to a pressure substantially equal to atmospheric pressure, with transformation of the mechanical pressure energy into kinetic mechanical energy.

10 Claims, 1 Drawing Sheet

(51) Int. Cl.
*B60K 6/44* (2007.10)
*B60W 10/08* (2006.01)
*B60W 20/00* (2016.01)

(56) References Cited

U.S. PATENT DOCUMENTS

| | | | | |
|---|---|---|---|---|
| 3,987,632 | A | * | 10/1976 | Pereda .............................. 60/671 |
| 4,455,834 | A | * | 6/1984 | Earle ................................ 60/659 |
| 5,318,142 | A | * | 6/1994 | Bates ........................ B60K 6/28 180/65.245 |
| 2002/0084121 | A1 | | 7/2002 | Hulen |
| 2002/0124561 | A1 | * | 9/2002 | Ban .......................... F02G 1/043 60/517 |
| 2004/0045292 | A1 | * | 3/2004 | Ogawa .................. F02D 11/105 60/651 |
| 2008/0250788 | A1 | * | 10/2008 | Nuel ....................... F02G 1/043 60/641.14 |

FOREIGN PATENT DOCUMENTS

| | | | |
|---|---|---|---|
| GB | 2188681 | A | 10/1987 |
| JP | 11022550 | A | 1/1999 |
| JP | 2008157144 | A * | 7/2008 |
| WO | 2008035788 | A1 | 3/2008 |

* cited by examiner

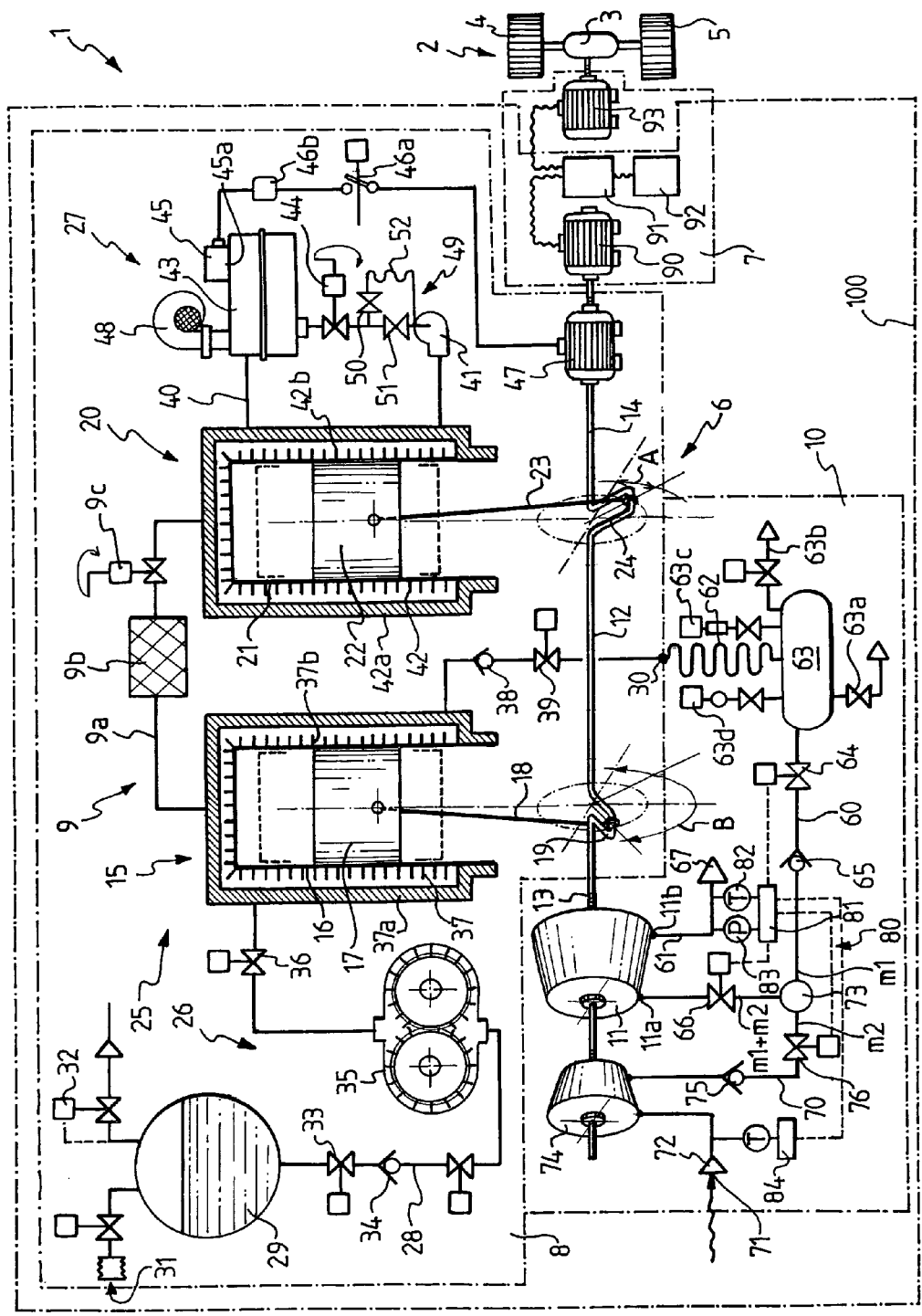

the present invention refers to an engine assembly of the
ENGINE ASSEMBLY FOR A MOTOR VEHICLE IN GENERAL AND PARTICULARLY FOR AN URBAN MOTOR VEHICLE

FIELD OF APPLICATION

The present invention refers to an engine assembly of the type operating with liquid air or another substantially inert gas in liquefied state, for a motor vehicle in general and for an urban motor vehicle in particular, such as a bus or a taxi.

BACKGROUND OF THE INVENTION

It should be specified here that engine assemblies of the type specified above have surpassed the prior art represented by compressed air traction, which, whilst more environmentally friendly, has the drawbacks of low autonomy and of the formation of condensate and ice.

Engine assemblies of the type specified above are known (EP 1 489 347) and achieve good results both in terms of autonomy and in terms of reducing urban pollution, compared to so called internal combustion engines, running on petrol, diesel fuel, methane, hydrogen or other, and also in terms of the elimination of condensate or ice. However, motor vehicles equipped with such known engine assemblies still represent a source of pollution, albeit at a reduced level.

The problem underlying the present invention is that of devising an engine assembly of the type specified above, which has structural and functional characteristics such as to overcome the drawbacks of the prior art.

SUMMARY OF THE INVENTION

The idea of solution of the aforementioned problem is to use the latent heat relative to the change in state transforming it into mechanical energy.

Based upon such an idea of solution and in order to solve the aforementioned technical problem, the present invention provides an engine assembly of the specified type, which is characterised in that it comprises a Stirling engine, having a cylinder, the so-called cold cylinder, in heat exchange relationship with the liquid air.

More specifically, the Stirling engine comprises two cylinders, the so-called cold cylinder and hot cylinder, kept at different temperatures by thermal means and connected together by an intercommunication duct, and two respective pistons, connecting to a crankshaft intended to drive the wheels of the motor vehicle through a transmission, in which said thermal means comprise a fluid circuit, extending between a tank, in which the fluid is a gas in liquefied state, and an outlet for the outflow of the fluid in compressed gas state, as well as a heat exchanger along said circuit, in heat exchange relationship with the so-called cold cylinder, to take the gasification heat of the fluid from the cylinder and maintain the cylinder at a temperature much lower than ambient temperature.

Advantageously, said thermal means comprise a closed circuit of a thermoconvector fluid, a circulation pump, a heat exchanger, a tank of the thermoconvector fluid, a gate valve arranged along said circuit, the heat exchanger being in heat exchange relationship with the so-called hot cylinder, to keep said cylinder at a temperature much higher than the ambient temperature.

It should be noted that the tank of the thermoconvector fluid has associated thereto heating means to heat the thermoconvector fluid itself. Preferably the heating means are in the form of a magnetron, per sé known, fed with power by an electric generator through an electromagnetic switch and a regulator for regulating the heating intensity of the fluid. The generator is actuated by the crankshaft. The heat exchanger is in heat insulation relationship with the environment.

The thermal means are completed with a fan associated with the tank of the thermoconvector fluid serving the magnetron.

Further characteristics and advantages of the engine assembly according to the present invention shall be observed from the following description of an example embodiment thereof given as indicative and not limiting purposes, with reference to the attached figure.

DETAILED DESCRIPTION OF THE DRAWINGS

The attached single FIG. 1 represents a schematic view of an engine assembly according to the invention.

DETAILED DESCRIPTION OF THE INVENTION

With reference to the attached figure, with 1 is globally and schematically indicated a motor vehicle, in the example an urban bus, represented limited to a single driving axle 2, equipped with a differential case 3 and with wheels 4 and 5, and with an engine assembly 6, acting on the driving axle 2 through a unit so-called electric shaft 7.

The engine assembly 6 according to the invention comprises a first unit 8, in which there is a Stirling engine 9, and a second unit 10, in which there is a piston engine 11. The Stirling engine 9 and the piston engine 11 have respective crankshafts 12 and 13, depicted collinear to constitute a single shaft 14, acting on the driving axle 2, through the aforementioned electric shaft 7.

As shall be seen in greater detail below, in the bus 1 the engine assembly 6 draws the energy necessary for the traction from the passage of air in liquid state to air in gas state substantially at ambient pressure. More specifically, the unit 8 of the engine assembly 6 draws energy from the change in state from air in liquid state to air in compressed state, and the unit 10 draws energy from the change of the air from compressed air state to the state of air at a pressure substantially equal to the ambient pressure.

The unit 8 comprises the Stirling engine 9, which has a cylinder-piston unit 15, with a cylinder 16, the so-called cold cylinder, and a piston 17, acting through a connecting rod 18 and a crank 19 on the crankshaft 12, as well as a cylinder-piston unit 20, with a cylinder 21, the so-called hot cylinder, and a piston 22, acting through a connecting rod 23 and a crank 24, on the crankshaft 12.

The two cylinder-piston units 15 and 20 are arranged with parallel axes and the relative connecting rods are connected to cranks angularly spaced by 90°. In particular, indicating the angular phase of the crank 24 of the cylinder-piston unit 20 with A and indicating the angular phase of the crank 19 of the cylinder-piston unit 15 with B, the two angular phases are in a 90° angular relationship)(B−A=90°). It is also possible to arrange the two cylinder-piston units with their axes perpendicular. In this case, the two connecting rods are connected to a single crank (or two angularly coinciding cranks). It is also possible to arrange the two cylinder-piston units collinear, that is, with the respective axes coinciding in a single axis.

Along with the Stirling engine 9, the unit 8 comprises thermal means 25, provided to keep the two cylinders 16 and 21 at a predetermined temperature difference. Indeed, it is thanks to this temperature difference maintained between the cylinders that the Stirling engine operates.

The thermal means 25 comprise cooling means 26 associated with the cylinder 16, the so-called cold cylinder, to keep it at a temperature much lower than ambient temperature, and heating means 27, associated with the cylinder 21, the so-called hot cylinder, to keep it at a temperature much greater than the ambient temperature.

The cooling means 26 comprise a fluid duct 28, extending from a tank 29 up to a connection 30. The tank 29 is equipped with a filler pipe 31 for filling the tank with liquid air and with a safety release valve 32.

It should be noted that instead of liquid air it is possible, without for this reason departing from the scope of protection of the invention, to use oxygen-poor air in liquid state, or else nitrogen in liquid state, as well as gas mixtures, again in liquid state, where these gases are in general poor, inert gases, and not valuable combustible gases.

A gate valve 33, a check valve 34, suitable for preventing the reflow of the fluid into the tank, a pump 35, of the cryogenic type, actuated by an electric motor not shown, a gate valve 36, a heat exchanger 37, arranged around the cylinder 16, so as to put the fluid, i.e. the liquid air, in heat exchange relationship with the cylinder itself, a check valve 38, suitable for preventing the reflow of the fluid into the exchanger 37 and another gate valve 39 are arranged along the duct 28. Such elements follow one another along the duct 28 in the same order with which they have been listed starting from the tank 29 up to the connection 30.

The heat exchanger 37 on the side facing outwards is equipped with heat insulation 37a, to avoid the passage of heat from the environment to the exchanger, whereas on the side facing the cylinder 16 it is equipped with (innings 37b to facilitate the heat exchange with the fluid contained in the cylinder.

It should be noted that the cryogenic pump 35 is adjustable for speed, through an appropriate adjustment of the electric actuation motor, to adjust the speed of the Stirling engine; in particular it is adjustable to increasing speeds with consequent acceleration of the motor vehicle.

The heating means 27 comprise a closed circuit 40 of a thermoconvector fluid, for example demineralised water. Along the circuit 40 there are a circulation pump 41, actuated by an electric motor not shown, a heat exchanger 42, arranged around the cylinder 21, so as to put the thermoconvector fluid, i.e. the demineralised water, in heat exchange relationship with the cylinder itself, a tank 43, and a gate valve 44 of the proportional type. For the heating of the demineralised water a heater 45 is provided, advantageously a microwave heater, known under the commercial name magnetron 45a, fed, through a remote control switch 46a, and a regulator 46b, by an electric generator 47 actuated by the shaft 14. In order to keep the water contained in the tank 43 stirred, a stirred, not shown, is provided, which is driven by an electric motor not shown. A fan 48 serving the magnetron 45a is provided.

The electric generator 47 supplies energy to the electric motors of the cryogenic pump 35, of the circulation pump 41 and to the electric motor of the agitator and of the fan.

The heat exchanger 42 on the side facing outwards is equipped with heat insulation 42a to avoid the passage of heat from the exchanger to the outside, whereas on the side facing the cylinder 21 it is equipped with finnings 42b to facilitate the heat exchange with the fluid contained in the cylinder.

In the closed circuit 40, between the proportional gate valve 44 and the pump 41, a deviation 49, which can be activated with suitable control of gate valves 50 and 51 is preferably provided, a heat exchanger 52 being provided on said deviation, to put the demineralised water in heat exchange relationship with the environment.

The Stirling engine is completed with a duct 9a extending between the cylinders 15 and 20 for the alternating transfer from one to the other of the fluid contained in the cylinders. Such a fluid is a pressurised gas, for example helium at 140 atm. Along the duct 9a, there is a finely divided metallic material 9b, with regeneration function, and a proportional gate valve 9c, able to be remote controlled from an open position to a closed position, to make the bus brake when needed.

In the unit 10 the piston engine 11 is fed with compressed air through a supply duct 60 and discharges through a discharge duct 61. In the piston engine 11 the compressed air expands substantially like an elastic spring and is eliminated at each stroke. Substantially, there is a yield that is equal to the mechanical yield of a spring, i.e. substantially unitary in the absence of friction.

The supply duct 60 extends from the connection 30 up to an inlet mouth 11a of the engine 11. Along the supply duct 60 there are a heat exchanger 62, in heat exchange relationship with the environment, a rest chamber 63, an electrically driven gate valve 64, a check valve 65 and an electrically driven gate valve 66.

The rest chamber 63, of suitable volume, is equipped with a condensate discharge tap 63a, with a breather pipe 63b, with a thermometer 63c and with a manometer 63d.

The discharge duct 61 extends between a discharge mouth 11b of the engine 11 and an exhaust 67 open to the outside.

It should be noted that the piston engine 11 can be any known alternating or rotary volumetric motor, suitable for being fed by just compressed air, but also any rotary flow motor, for example a turbine.

The unit 10 is completed with an auxiliary supply duct 70 that extends between an ambient air intake mouth 71, equipped with a filter 72, and a connection 73 that is located along the supply duct 60, in a position between the check valve 65 and the gate valve 66.

Along the duct 70 act a compressor 74 actuated by the shaft 14, a check valve 75 and an electrically driven gate valve 76.

It should be noted that the compressor 74 can be of the type using pistons or of the flow type, for example a turbocompressor.

In order to obtain an output of an emission of air at a pressure and at a temperature substantially equal to the ambient pressure and temperature, automatically, a closed loop control circuit is provided for, globally indicated with 80, to control the electrically driven gate valves 64, 66, 76. The circuit, per sé conventional, comprises a control unit 81 fed with the desired values for the pressure and temperature of the fluid coming out from the exhaust 67, also fed with the actual temperature and pressure values measured by thermometers 82 and 84 and by manometers 83, or more precisely by appropriate transducers, suitable for comparing said actual values with the desired values and consequently for controlling the gates valves with the differential values.

The so-called electric shaft unit 7 comprises an electric generator 90 actuated by the shaft 14, to keep a supercapacitor 92 charging, through an electric control unit 91, to supply electrical energy to an electric motor 93 acting on the driving axle 2.

It should be noted that the bus 1 advantageously comprises a tender or trailer 100, on which there are the unit 8 and the unit 10, i.e. the engine assembly 6 as a whole, as well as the electric shaft unit 7, limited to the electric generator 90, the control unit 91 and the supercapacitor 92, i.e. excluding the electric motor 93.

It should also be noted that, in a simplified variant embodiment, the shaft 14 controls the differential 3 mechanically through a conventional speed change, instead of by the electric shaft 7. In the case in which the tender 100 is provided, the drive shaft 14 controls the differential 3 through a transmission shaft with appropriate articulated joints, for example cardan joints.

The operation of the engine assembly 6 according to the invention is described hereafter with reference to cruise speed of the city bus and with special attention to the succession of reversible phenomena undergone by the gas during the path from the tank 29 up to the discharge into the environment through the exhaust 67.

The air is contained in the tank 29 in liquid state and is conserved at atmospheric pressure and at a temperature of about −198° C., thanks to the safety valve 32.

The air in liquid state is taken from the tank 29 along the duct 28 by the cryogenic pump 35 in a predetermined amount m1, variable with the speed of the cryogenic pump 35, as necessary for the operation of the Stirling engine on the cold cylinder side, and it is transferred at a desired pressure, preferably 5 bars absolute, into the heat exchanger 37.

In the exchanger 37 the liquid air gasifies, i.e. it changes state passing from liquid state to compressed gas state. During such a gasification step it receives the vaporisation energy from the helium gas contained in the cylinder 16. Consequently, the helium contained in the cylinder 16 cools down.

In this way, the cylinder 16 is maintained at a temperature much lower than the ambient temperature. The air that has become gaseous leaves the exchanger 37 through the duct 28 pushed by the new liquid air injected through the cryogenic pump 35 into the exchanger 37, again through the duct 28 up to the connection 30. The cryogenic pump 35 transmits the pulse energy necessary to raise the pressure up to 5 atmospheres bars absolute to the liquid air and produces the transportation motion of the air along the duct 28, thus through the exchanger 62 until the rest chamber 63 is reached.

In the closed circuit 40 demineralised water is put in circulation, heated by the magnetron 45*a* at a temperature preferably of 180° C. Travelling in the exchanger 42, the hot water gives off heat and determines the heating of the helium gas contained in the cylinder 21. In this way, the helium is taken to a temperature much higher than the ambient temperature.

It should be noted that in the case in which the magnetron is not activated, a circulation of water is nevertheless maintained in the branch 49, thanks to the suitable manoeuvring of the gate valves 50 and 51. In this way, the water travels through the heat exchanger 52 in heat exchange relationship with the environment, in such a way maintaining the temperature of the helium gas in the hot cylinder substantially equal to the ambient temperature. In both cases a temperature difference is produced between cold cylinder 16 and hot cylinder 21. In the first case the difference would be of 378° C. whereas in the second case the temperature difference would be of about 210° C.

In both cases, thanks to the aforementioned temperature difference between cold cylinder and hot cylinder, the Stirling engine is able to operate with the alternating transfer of the helium gas between the two cylinders and with delivery of mechanical energy to the crankshaft 12.

It should be noted that the unit 8, thanks to the Stirling engine 9, thus provides kinetic mechanical energy, corresponding to the latent heat relative to the change in state from liquid state to compressed gas state, and it also provides, to the connection 30, compressed air substantially at a temperature of −198° C., intended for the driving unit 10.

As far as the unit 10 is concerned, the compressed air provided to the connection 30 is pushed to cross the heat exchanger 62 that is in heat exchange relationship with the atmosphere and therefore its temperature substantially increases until it approaches the atmospheric temperature.

The air is thus injected into the rest chamber 63. Here, as the air stops, the reconversion of all of the pulse and kinetic energy received through the cryogenic pump 35 into internal energy takes place, reaching an average temperature of 70° C. The pressure of the air in the rest chamber 63 is substantially 5 atmospheres.

The compressed air at this point contains sufficient potential energy to supply again mechanical energy. The compressed air through the duct 60 feeds the engine 11 from which it is discharged through the duct 61. The air in the engine 11 gives off internal energy and such internal energy, substantially elastic energy, turns into useful mechanical energy on the crankshaft 13.

In other words, the mechanical energy of the pressurised gas turns into kinetic mechanical energy delivered to the crankshaft. The yield of this transformation is that of a passage of energy from mechanical energy into mechanical energy that, in the absence of friction, would be unitary, and, depending only upon friction, may even reach 0.98.

In order to avoid the discharge of the air that has worked in the engine 11 taking place at a low temperature (even −90° C.), the compressed air arriving from the rest chamber 63 in the connection 73 is added to the compressed air from the compressor 74. The compressor 74 is actuated by the shaft 13 and takes air from the environment through the filter 72 in an amount m2.

The compressor 74, compressing the air taken from the environment up to 5 atmospheres, discharges the same air after compression to a temperature of about 400° C. and such compressed air is pushed into the connection 73. In this connection the mixing of the two amounts of air m1 and m2 takes place. The air resulting from the mixture (m1+m2) shall have a temperature close to 300° C., according to the value selected for m2. Therefore the mixture of the two air (m1+m2) shall allow the engine 11 to discharge the air through the exhaust 67, at no less than −20° C.: this being the value that is admissible as exhaust temperature into the environment.

It should be noted that the temperature and pressure coming out from the exhaust 67 are constantly monitored through the temperature and pressure transducers 82, 83. Similarly, a transducer 84 is provided that measures the temperature in the duct 70 at the inlet of the compressor 74. The signals in output from the transducers are sent constantly to a control unit 81 that compares it with reference signals to emit control signals to the valve 64 that controls the flow rate m1 and to the valve 76 that also controls the flow rate m2.

In the case in which it becomes necessary for the vehicle to brake, with the engine according to the invention it is possible to obtain the so-called engine-brake effect by acting upon the gate valve 9*c*. The transfer of the helium gas between the two cylinders of the Stirling engine is hampered until it is interrupted: as a result of this the Stirling engine slows down until it stops.

In the case in which it becomes necessary for the motor vehicle to accelerate, it is possible to obtain this effect through a suitable increase in speed of the cryogenic pump 35.

The present invention provides, more generally, a method for transforming the latent heat of air, or of a substantially inert gas, in liquefied state into mechanical energy able to be used for a vehicle in general and for an urban bus in particular. This method comprises the step of put the air or the gas in liquid state into heat exchange relationship with the so-called cold cylinder of a Stirling engine.

The main advantage of the method and of the engine assembly according to the present invention lies in the fact that it achieves environmentally exemplary behaviour of an urban bus, any emission of combustion residues having been completely eliminated. In other words, the only emission of the motor vehicle consists of air released substantially at ambient pressure and temperature.

A further important advantage of the engine assembly according to the present invention is its increased yield. Indeed, the energy that has been expended to obtain the liquid air from ambient air, including the latent heat relative to the change in state from gas state to liquid state is transformed into mechanical energy at the wheels, apart of course for the losses due to friction. In other words, there is no type of fuel loaded onto the motor vehicle, and no product or combustion residue is released into the environment.

As a whole, therefore, the engine assembly according to the invention has high autonomy, runs without the formation of condensate and ice, achieves an unusual yield and is totally environmentally friendly.

Of course, a man skilled in the art can bring numerous modifications and variants to the engine and method described above, in order to satisfy contingent and specific needs, all of which, however, fall within the scope of protection of the present invention, as defined by the following claims.

The invention claimed is:

1. An engine assembly for a motor vehicle of the type running on liquid air, comprising:
    a liquid air tank;
    a Stirling engine with a cold cylinder and a hot cylinder;
    a heat exchanger in fluid communication with said liquid air tank and in heat exchange relationship with said cold cylinder;
    a volumetric or flow motor fed with compressed air via a first supply duct coming out from the Stirling engine;
    a compressor; and
    an auxiliary supply duct for said volumetric or flow motor, the auxiliary supply duct connected to the first supply duct to feed said volumetric or flow motor with air taken from the environment in a predetermined amount and brought to a predetermined temperature and pressure by the compressor.

2. The engine assembly according to claim 1, wherein said heat exchanger is thermally insulated from the environment.

3. The engine assembly according to claim 1, comprising a further heat exchanger, in communication with a tank of a hot fluid and in heat exchange relationship with said hot cylinder.

4. The engine assembly according to claim 3, wherein said further heat exchanger is thermally insulated from the environment.

5. The engine assembly according to claim 3, wherein said tank of a hot fluid is connected to a heater.

6. The engine assembly according to claim 5, wherein the heater is a magnetron.

7. An engine assembly for a motor vehicle of the type running on liquid air, comprising:
    a liquid air tank;
    a Stirling engine with a cold cylinder and a hot cylinder;
    a heat exchanger in fluid communication with said liquid air tank and in heat exchange relationship with said cold cylinder;
    a volumetric or flow motor fed with compressed air coming out from the Stirling engine; and
    crankshafts for driving wheels of the motor vehicle,
    wherein the Stirling engine and the volumetric or flow motor are connected to the crankshafts,
    comprising, in a position located between the crankshafts and the wheels of the vehicle, an electric shaft including an electric generator, a supercapacitor and an electric motor; and
    comprising a towing tender of the motor vehicle for supporting the Stirling engine, the volumetric or flow motor, the electric generator and the supercapacitor.

8. The engine assembly according to any claim 1, comprising, between the liquid air tank and the heat exchanger of the cold cylinder, a cryogenic pump adjustable to increasing speeds for the acceleration of the motor vehicle.

9. The engine assembly according to claim 1, comprising a proportional gate valve arranged on an intercommunication duct between the cold cylinder and the hot cylinder of the Stirling engine, adjustable from an open position towards a closed position, to make the motor vehicle brake.

10. The engine assembly according to claim 1, comprising a rest chamber, of predetermined volume, arranged on a feed duct of the volumetric or flow motor.

* * * * *